United States Patent
O'Neil et al.

(10) Patent No.: US 12,014,478 B2
(45) Date of Patent: Jun. 18, 2024

(54) IMAGE ADJUSTMENT BASED ON LOCAL CONTRAST

(71) Applicants: Apical Limited, Cambridge (GB); Arm Limited, Cambridge (GB)

(72) Inventors: Liam James O'Neil, Bedale (GB); Yanxiang Wang, Manchester (GB); Güney Kayim, Nottingham (GB); Alexis Leonardo Lluis Gomez, Castle Donington (GB)

(73) Assignee: ARM LIMITED, Cambridge (GB)

( * ) Notice: Subject to any disclaimer, the term of this patent is extended or adjusted under 35 U.S.C. 154(b) by 725 days.

(21) Appl. No.: 17/155,653

(22) Filed: Jan. 22, 2021

(65) Prior Publication Data
US 2022/0237753 A1 Jul. 28, 2022

(51) Int. Cl.
| | |
|---|---|
| *G06T 5/92* | (2024.01) |
| *G06N 3/04* | (2023.01) |
| *G06T 1/20* | (2006.01) |
| *G06T 5/20* | (2006.01) |

(52) U.S. Cl.
CPC ............. *G06T 5/92* (2024.01); *G06N 3/04* (2013.01); *G06T 1/20* (2013.01); *G06T 5/20* (2013.01)

(58) Field of Classification Search
None
See application file for complete search history.

(56) References Cited

U.S. PATENT DOCUMENTS

| | | | | |
|---|---|---|---|---|
| 6,339,432 B1 * | 1/2002 | Grossman | ............. | G09G 5/393 345/639 |
| 6,625,310 B2 * | 9/2003 | Lipton | ............. | G06V 10/28 382/218 |
| 7,532,770 B2 * | 5/2009 | Pfister | ............. | G06T 15/503 382/284 |
| 9,165,210 B1 * | 10/2015 | Srinivasan | ............. | G06T 5/008 |

(Continued)

FOREIGN PATENT DOCUMENTS

| | | | | |
|---|---|---|---|---|
| GB | 2590519 A | * | 6/2021 | ............. G06T 5/00 |
| JP | 2004005660 A | * | 1/2004 | ......... G06K 9/00281 |
| WO | WO-2008065594 A1 | * | 6/2008 | ........... G06T 15/503 |

OTHER PUBLICATIONS

He Zhao, Huiqi Li, Li Cheng, Improving retinal vessel segmentation with joint local loss by matting, Pattern Recognition, vol. 98 (Year: 2020).*

(Continued)

*Primary Examiner* — Vu Le
*Assistant Examiner* — Charles C L Penny
(74) *Attorney, Agent, or Firm* — EIP US LLP (57) ABSTRACT

A method, processor, and computer readable medium for generating blended intensity data for processing by a further processor, the method comprising the steps of generating a local contrast map based on image data, the local contrast map comprising a plurality of contrast values. An alpha mask is generated by associating an alpha mask value to each contrast value. First intensity data based on the image data using a first intensity calculation method and second intensity data based on the image data using a second intensity calculation method are also generated. The blended intensity data is generated by blending from at least one of the first intensity data and the second intensity data based on the alpha mask values; and outputted to the further processor.

18 Claims, 5 Drawing Sheets

(56) References Cited

U.S. PATENT DOCUMENTS

| | | | | |
|---|---|---|---|---|
| 9,613,407 | B2* | 4/2017 | Atkins | G06T 5/007 |
| 9,741,099 | B2* | 8/2017 | Lim | G06T 5/001 |
| 2004/0189676 | A1* | 9/2004 | Dischert | G09G 5/20 |
| | | | | 701/1 |
| 2010/0144291 | A1* | 6/2010 | Stylianou | G09B 21/006 |
| | | | | 455/90.1 |
| 2010/0177203 | A1* | 7/2010 | Lin | H04N 23/60 |
| | | | | 348/222.1 |
| 2012/0002899 | A1* | 1/2012 | Orr, IV | H04N 23/6811 |
| | | | | 382/282 |
| 2012/0229650 | A1* | 9/2012 | Matthews | G06T 5/50 |
| | | | | 348/E5.085 |
| 2014/0152686 | A1* | 6/2014 | Narasimha | G06T 5/50 |
| | | | | 345/589 |
| 2017/0064189 | A1* | 3/2017 | Chikano | H04N 23/672 |
| 2021/0150681 | A1* | 5/2021 | Sytnik | G06T 5/30 |
| 2022/0156887 | A1* | 5/2022 | Lin | G06T 7/90 |

OTHER PUBLICATIONS

K. Panetta, C. Gao and S. Agaian, "No reference color image contrast and quality measures," in IEEE Transactions on Consumer Electronics, vol. 59, No. 3, pp. 643-651, Aug. 2013, doi: 10.1109/TCE.2013.6626251. (Year: 2013).*

T. Yu, K. Song, P. Miao, G. Yang, H. Yang and C. Chen, "Nighttime Single Image Dehazing via Pixel-Wise Alpha Blending," in IEEE Access, vol. 7, pp. 114619-114630, 2019, doi: 10.1109/ACCESS.2019.2936049. (Year: 2019).*

* cited by examiner

IMAGE ADJUSTMENT BASED ON LOCAL CONTRAST

BACKGROUND OF THE INVENTION

Field of the Invention

The present disclosure relates to methods, processors and a computer-readable storage medium for tone mapping based on local contrast.

Description of the Related Technology

Tone mapping is an image processing technique that is used to map the colors of one (input) image to the colors of another (output) image.

Tone mapping is sometimes used to cater for differing dynamic ranges of image-handling media. For example, the light-sensitive pixels of a camera may generate a set of intensities within a certain dynamic range. Other types of image-handling media such as a display or a printer may have a different dynamic range. Tone mapping may be used to convert the image intensities between these differing dynamic ranges so that they make appropriate use thereof. One common tone mapping algorithm compresses low and high input intensity ranges by mapping them respectively to output intensity ranges that are relatively narrow whilst mapping a range of intermediate input intensities to a relatively broad range of output intensities. A few examples of dynamic ranges include High Dynamic Range "HDR", Standard Dynamic Range "SDR", and Low Dynamic Range "LDR".

Tone mapping may additionally or alternatively be used to provide a particular visual effect. A more aesthetically pleasing image may for instance be provided by adjusting the colors of skin tones in particular.

Images may be encoded in a wide variety of color models. One common color model is the RGB color model that defines each pixel in an image in terms of the intensities of each of red, green, and blue color channels. Another common color model is the YUV color model that defines each pixel in an image in terms of its luma, Y, and two chrominance components: U, for blue projection and V for red projection. Luma represents brightness, or intensity. The color models YUV, YCbCr, and YPbPr also represent pixels in terms of luma and chrominance components and are also often used to encode color images.

In general, tone mapping may therefore involve adjusting the intensity and/or chrominance of the pixels or sub-pixels in an image to produce an improved output.

SUMMARY

According to a first aspect of the present disclosure, there is provided a method for generating blended intensity data for processing by a processor, the method comprising the steps of generating a local contrast map based on image data, the local contrast map comprising a plurality of contrast values; generating an alpha mask by associating an alpha mask value to each contrast value; generating first intensity data using a first intensity calculation method and second intensity data using a second intensity calculation method; generating the blended intensity data by blending from at least one of the first intensity data and the second intensity data based on the alpha mask values; and outputting the blended intensity data to the processor.

According to a second aspect of the present disclosure, there is provided a processor for generating blended intensity data for processing by a further processor, the processor comprising: an input module for obtaining image data; a contrast image generation module for generating a local contrast map based on image data, the local contrast map comprising a plurality of contrast values; an alpha mask generation module for generating an alpha mask by associating an alpha mask value to each contrast value; an intensity data generation module for generating first intensity data using a first intensity calculation method and second intensity data using a second intensity calculation method; a blended intensity data calculation module for generating the blended intensity data by blending from at least one of the first intensity data and the second intensity data based on the alpha mask values; and an output module for outputting the blended intensity data to the further processor.

According to a third aspect of the present disclosure, there is provided a non-transitory computer-readable storage medium comprising a set of computer-readable instructions stored thereon, which when executed by at least one processor, cause the at least one processor to generate blended intensity data for processing by a further processor, the instructions comprising: generating a local contrast map based on image data, the local contrast map comprising a plurality of contrast values; generating an alpha mask by associating an alpha mask value to each contrast value; generating first intensity data using a first intensity calculation method and second intensity data using a second intensity calculation method; generating the blended intensity data by blending from at least one of the first intensity data and the second intensity data based on the alpha mask values; and outputting the blended intensity data to the further processor.

BRIEF DESCRIPTION OF THE DRAWINGS

Further features and advantages will become apparent from the following description of preferred embodiments, given by way of example only, which is made with reference to the accompanying drawings in which like reference numerals are used to denote like features.

DETAILED DESCRIPTION OF CERTAIN INVENTIVE EMBODIMENTS

Details of methods and apparatus according to examples will become apparent from the following description with reference to the Figures. In this description for the purposes of explanation, numerous specific details of certain examples are set forth. Reference in the specification to 'an example' or similar language means that a feature, structure, or characteristic described in connection with the example is included in at least that one example but not necessarily in other examples. It should be further noted that certain examples are described schematically with certain features omitted and/or necessarily simplified for the ease of explanation and understanding of the concepts underlying the examples.

Tone mapping has several uses spanning different domains including consumer media, computer vision, and machine learning, and is a staple feature of several systems such as image processing, automotive applications, and digital media. Tone mapping often involves the implementation of intensity data calculation methods which can be used to create a greyscale representation of an image using an RGB color model, or other appropriate color model such as RAW or YUV for example. This is often used to inform of the perceived luminance of an image according to the human visual system whilst also providing a dimensionality reduction and thus lowering computational complexity.

As mentioned previously, intensity calculation algorithms all come with their respective advantages and drawbacks. For instance, creating intensity data using a method such as MaxRGB which replaces each pixel with the maximum value of its color channels, retains the knowledge of each pixel's peak value. This can allow the intensity calculation algorithm to apply modifications to the source image, and the knowledge of the peak value can mitigate unwanted effects such as color shift, clipping, or artefacts. Other intensity data calculation methods such as the Luma intensity calculation method replaces each pixel value with the weighted average of its respective color channels, also known as the luminance. This is less susceptible to noise spikes and has an objectively more accurate depiction of the human visual system. It will be appreciated that other intensity data calculation methods may be used when generating intensity data.

Given each of the methods, and other methods used to produce intensity data, has their own distinct advantages and disadvantages, it is desirable to use different methods on different parts of the image data to obtain the best overall intensity data output. Dynamically selecting which method to use can improve the overall quality of the intensity data output and may be achieved by using a local contrast value to discern which of the methods would best be suited.

Figure 1:
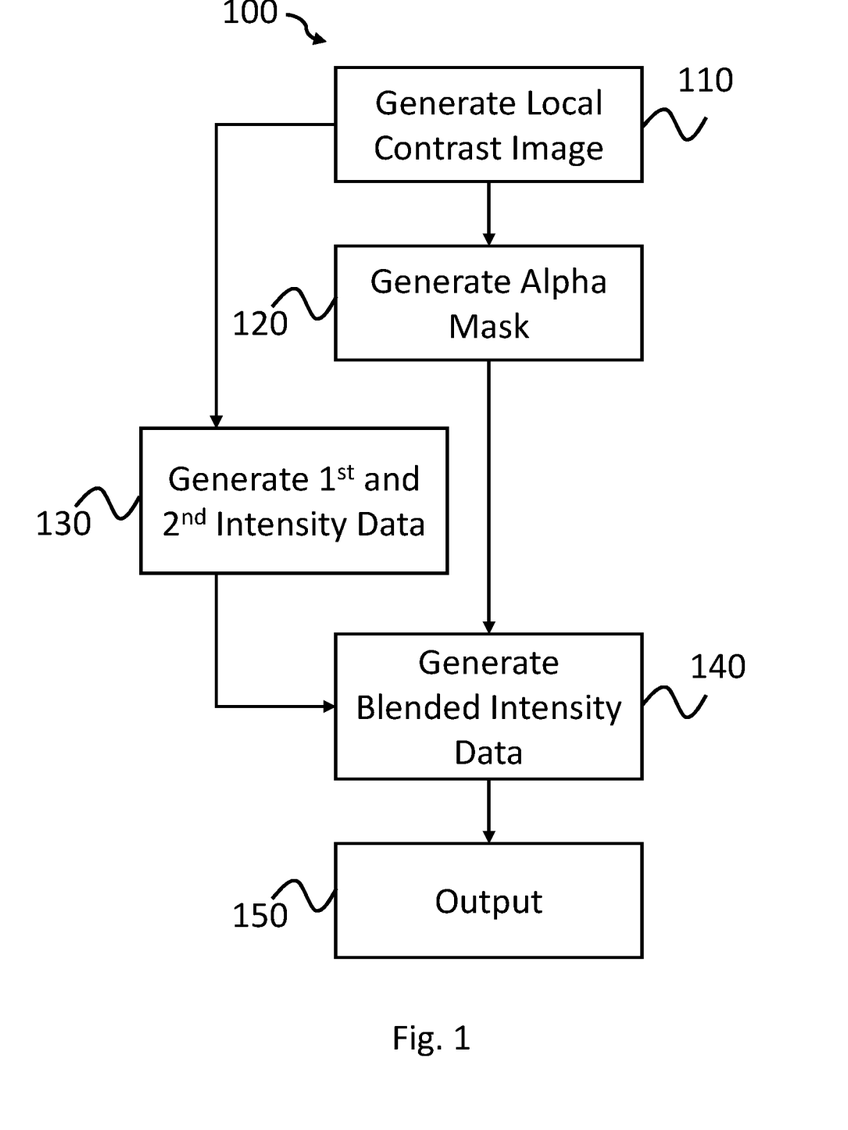
FIG. 1 is a flow chart of a method for generating a blended intensity data according to an example.

FIG. 1 is a flow chart of a method 100 for generating blended intensity data according to an example. At item 110, a local contrast map comprising a plurality of contrast values, each representing individual pixels of input image data is generated. The input image may be received from one or more sensors, such as a camera configured to capture visual data of the surrounding image. Alternatively, in some examples, the image data is stored on memory associated with a system and retrieved from the memory for processing by a processor configured to implement the method as will be described in further detail below.

The image data may take several forms. For example, the image data may use an RGB color model, YUV color model, RAW color model or any other appropriate color model. It will be appreciated that other types of image data may also be used such as a processed image file in a given file format, such as JPEG, PNG, or GIF.

In one example, generating the local contrast map at item 110 may involve using generating a representation of the image data based on the difference between peak and trough values of its surrounding pixel neighborhood. This involves using a range filter which is a non-linear filtering operation, and as will be described in further detail below in relation to FIG. 2. By generating a local contrast map, the ability to discern and/or indicate a divergence in a particular region from its greyscale equivalent is improved. For example, a region of image data, such as RGB image data may be defined as having a small local contrast if all three color channels represent the same or similar numeric values. Conversely, if a region of image data has one or more channels which contain values which are significantly greater or smaller than their counterparts, then that region may have a large local contrast. As such, regions which larger contrast values in the local contrast map are more challenging to convert to greyscale. An example of a local contrast map is shown in FIG. 3 and will be described in further detail below.

Following the generation of the local contrast map at item 110, the method proceeds to item 120 where an alpha mask is generated. The alpha mask comprises an upper threshold and a lower threshold, which are used to determine which of the intensity data calculation methods are used. For example, the intensity data calculation methods may be the MaxRGB and Luma described above.

The first, lower threshold may be used to identify an upper bound of contrast value in the local contrast map, and when generating the intensity data, for any pixels with a corresponding contrast value up to the lower threshold, the MaxRGB method may be used. Similarly, the upper threshold may be used to identify a lower bound of contrast value in the local contrast map, and when generating the intensity data, for any pixels with a corresponding contrast value above the upper threshold, the Luma method may be used. It will be appreciated that the intensity data calculation methods may be different or applied differently. For example, the inverse of the above example may be true in that the Luma method is used for pixels with a corresponding contrast value up to the lower threshold and the MaxRGB method may be used for pixels with a corresponding contrast value above the upper threshold.

For contrast values which are between the upper and lower thresholds, blended intensity data may be used based on both intensity data calculation methods as will be described in further detail below. That is, the alpha mask value defines a weighting of the first and second intensity data.

Following the generation of the alpha mask, at least first and second intensity data is generated at item 130. The first and second intensity data are generated based on the input image data 100, and each of the intensity data calculation methods. This enables portions of the intensity data to be selected in accordance with the alpha mask at item 140 to create blended intensity data. The generation of the first and second intensity data may occur sequentially as shown in the method 100 of FIG. 1, however it will be appreciated that the generation of the intensity data may occur in parallel with items 110 and 120.

At item 140, following the generation of the intensity data and the alpha mask, blended intensity data is generated. The blended intensity data is formed of portions of each of the first and second intensity data as indicated by the alpha mask. So, where the contrast value of a given pixel is below the lower threshold in the alpha mask, the corresponding pixel in the first intensity data is used and where the contrast value of a given pixel is above the upper threshold in the alpha mask, the corresponding pixel of the second intensity data is used. Pixels with contrast values between the upper and lower thresholds a weighted combination of the corresponding pixels in the first and second intensity data are used, whereby the weighting is defined by the alpha mask value.

Once the blended intensity data has been generated, at item 150, the blended intensity data is output. The output of the blended intensity data may involve storing the blended intensity data to memory, passing the blended intensity data to a further processor, such as a neural processing unit, or graphics processor, or outputting the blended intensity data for display.

Figure 2:
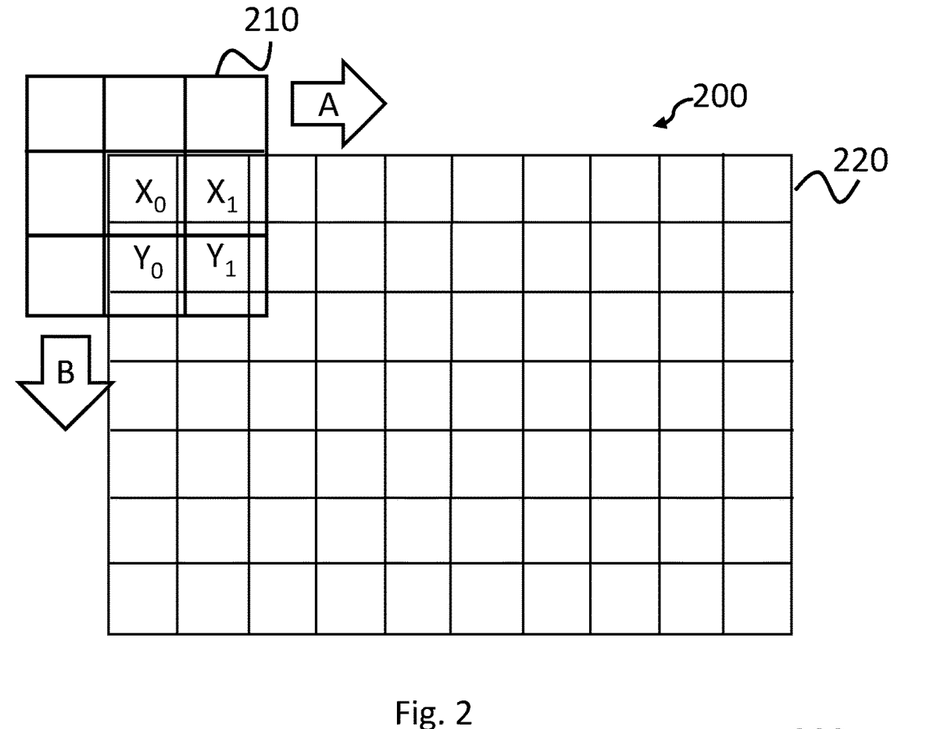
FIG. 2 is a representation of a range filter and image data according to an example.
Figure 3:
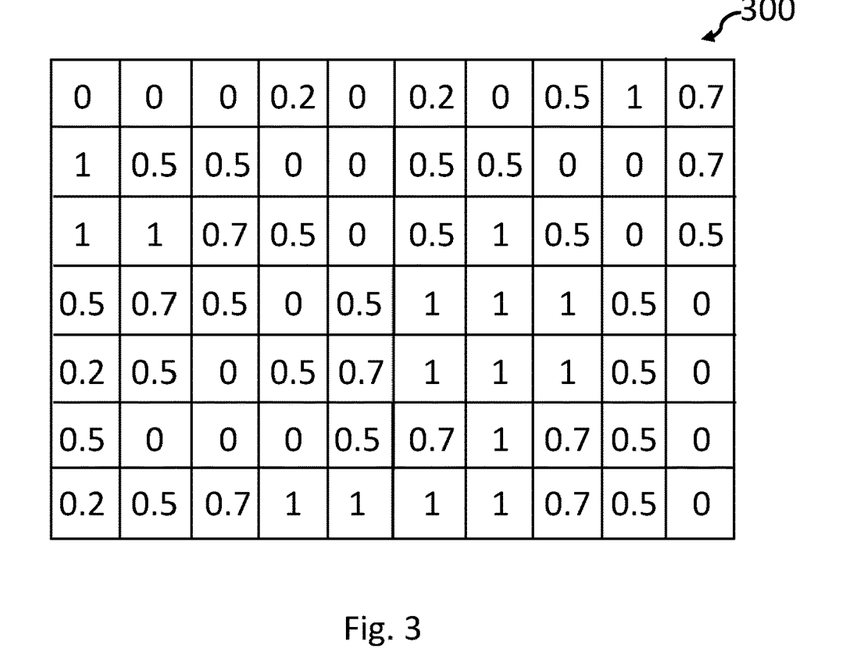
FIG. 3 is a representation of a local contrast map according to an example.

FIG. 2 is a representation 200 of a range filter 210 and image data 220 according to an example. In the example of FIG. 2, the range filter 210 is a 3×3 window arranged to slide in accordance with arrows A and B across each pixel within the image data 220 and produce a local contrast map comprising a plurality of contrast values corresponding to each pixel in the image data 220. It will be appreciated that the range filter 210 may be any N×N sized window.

The range filter 210 is arranged to slide across the image data 220 pixel-by-pixel such that the when the range filter 210 is positioned over a given pixel the contrast value associated with pixel $X_0$ is based on the difference between the maximum and minimum pixel values within the region covered by the range filter. Therefore, for pixel $X_0$, the difference between the maximum and minimum values of the pixel values of pixels, $X_0$, $X_1$, $Y_0$, and $Y_1$.

The pixel values may be based on the color values of each pixel. For example, if the image data 220 is image data using an RGB color model, then the R, G and B values for each of the pixels may be averaged across all pixels covered by the range filter 210, and the difference between each calculated. If the average of the R, G, and B values are the same or similar, this means that there is a small local contrast, however, if they differ significantly this may represent a larger local contrast.

The range filter 210 is arranged to move across the image data 220 pixel by pixel as indicated by arrows A and B, such that a local contrast map comprising contrast values associated with each pixel of the image data 22 is produced. An example of such a local contrast map is shown in FIG. 3.

FIG. 3 is a representation of a local contrast map 300 according to an example. The local contrast map 300 comprises pixels corresponding to the pixels of the image data, such as image data 220 of FIG. 2. In the example local contrast map 300 of FIG. 3, the contrast values associated with each pixel of the image data range from 0 to 1, where 0 represents a low local contrast—that is the difference between the maximum and minimum in the region covered by the range filter is low, and where 1 represents a high local contrast in the region. Values between 0 and 1 represent a middling contrast between low local contrast and high local contrast. It will be appreciated that the range of contrast values may exist over a greater range than the 0 to 1 range depicted in FIG. 3.

Figure 4:
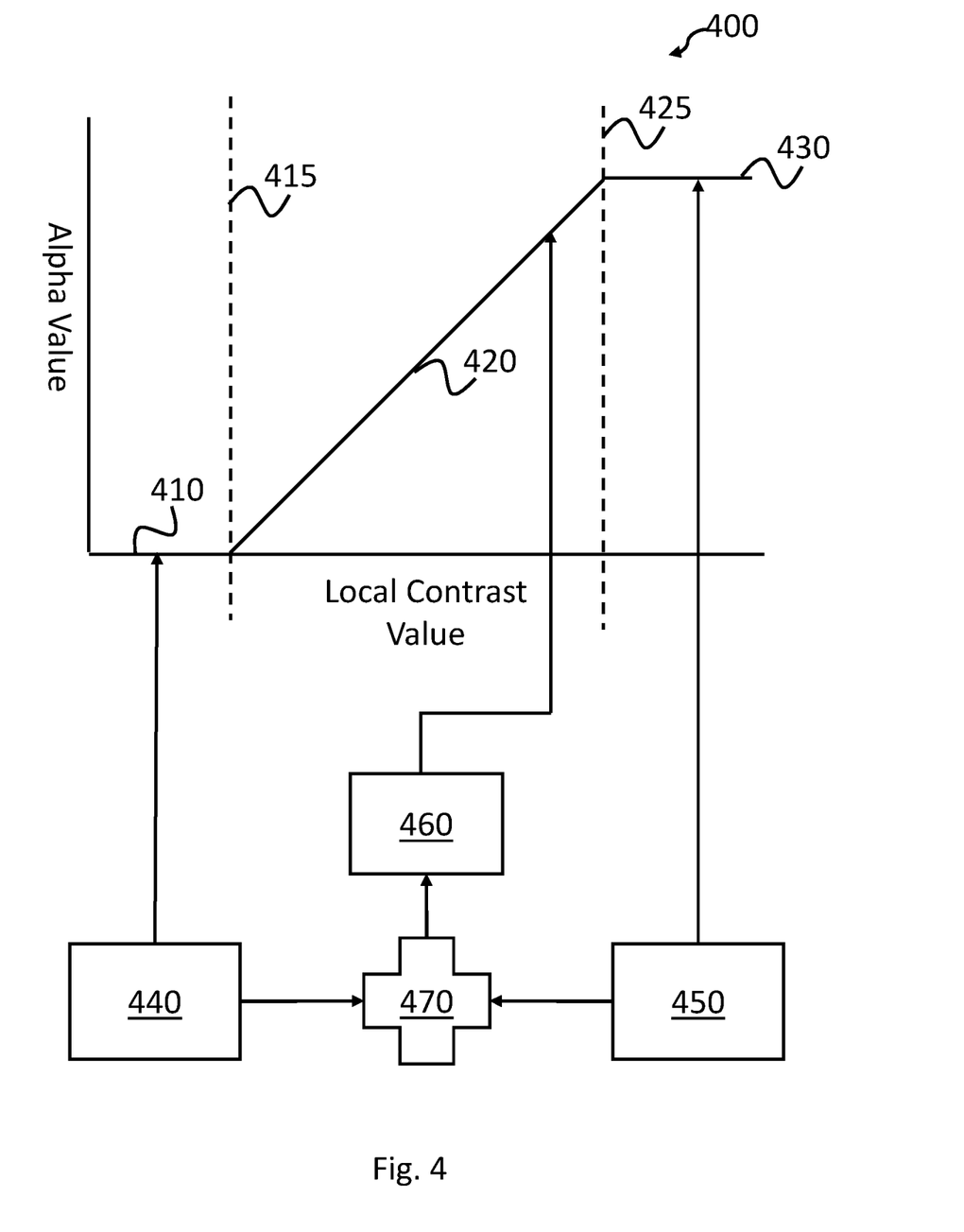
FIG. 4 is a schematic representation of an alpha mask graph according to an example.

FIG. 4 is a schematic representation of alpha mask graph 400 according to an example. The alpha mask graph 400 is used to indicate which of two methods may be used when generating a given portion of blended intensity data based on the local contrast map, such as the local contrast map 300 shown in FIG. 3 and generated in accordance with the method described in relation to FIG. 2.

The alpha mask graph 400 contains at least three portions, a first portion 410, a second portion 420, and a third portion 430. Each portion indicates which of the intensity data are used for a given region based on the associated contrast value indicated in the local contrast map 300. The boundary between the first portion 410 and the second portion 420 is indicated by a first, lower threshold 415 and the boundary between the second portion 420 and third portion 430 is indicated by a second, upper threshold 425.

The first portion 410 of the alpha mask graph 400 indicates the use of a first intensity data 440 for a given portion of the local contrast map 300. The first intensity data 440 is used to indicate regions of the blended intensity data (not shown) where the corresponding region in the local contrast map 300 has contrast values below the lower threshold value 415.

Similarly, the third portion 430 of the alpha mask graph 400 indicates the use of a second intensity data 450 for a given portion of the local contrast map 300. The second intensity data 450 is used to indicate regions of the blended intensity data (not shown) where the corresponding region in the local contrast map 300 has contrast values above the upper threshold value 425.

The second portion 420 of the alpha mask graph 400 is used to indicate a blending between the use of a first intensity data 440 and a second intensity data 450. For example, as indicated in FIG. 4, where a contrast value in the local contrast map 300 has a value between the lower threshold 415 and the upper threshold 425, a corresponding blending between the first intensity data 440 and the second intensity data 450. The example 400 shown in FIG. 4 provides for a linear relationship between the first threshold 415 and second threshold 425 however it will be appreciated that other relationships, such as a power curve, look-up table, or tunable linear equation may be used to provide the associated blending between the first intensity data 440 and the second intensity data 450.

For example, where the contrast values in the local contrast map 300 are between 0 and 1 as indicated in FIG. 3, a contrast value of 0 would indicate the first intensity data 440 is used for the corresponding portion when generating the blended intensity data, and a contrast value of 1 would indicate the second intensity data 450 is used for the corresponding portion when generating the blended intensity data. If the lower threshold 415 was 0.2 and the upper threshold 425 was 0.7, then portions in the local contrast map 300 with a local contrast value between 0.2 and 0.7 would use a blending of the first intensity data 440 and the second intensity data 450 in accordance with the alpha mask graph 400 and the relationship indicated between the first threshold 415 and the second threshold 425. In this example, an intermediary blended intensity data 460 would be generated by combining 470 the first intensity data 450 and the second intensity data 450 with the relevant ratios. In the example shown in FIG. 4, the relationship between the first threshold 415 and second threshold is linear, therefore continuing with the previous example values, if a portion of the local contrast map 300 had a contrast value of 0.5 then the intermediary blended intensity data 460 may represent 50% of the first intensity data 440 and 50% of the second intensity data 450 in accordance with an alpha blending strategy defined by the alpha mask graph 400.

Figure 5:
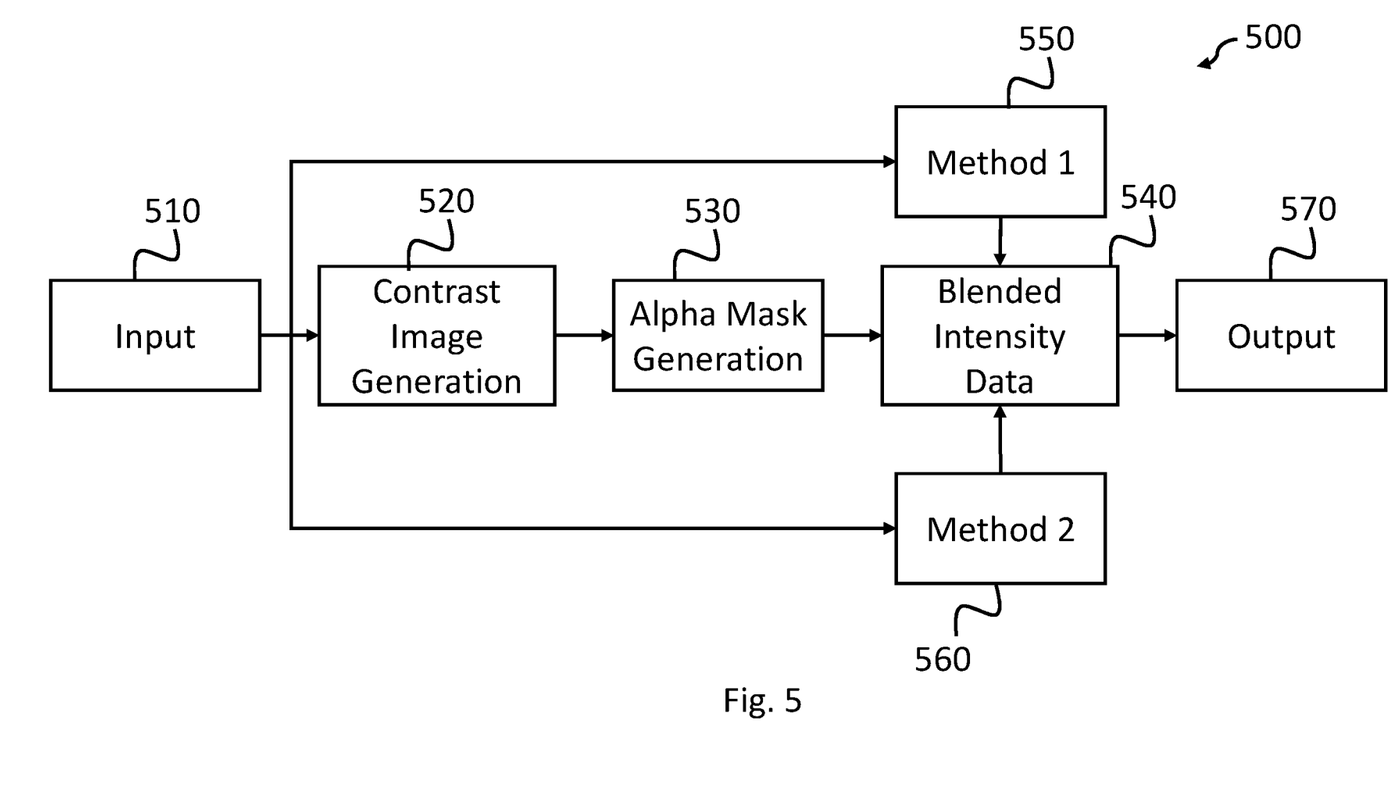
FIG. 5 is a schematic representation of the generation of a blended intensity data for output according to an example.

FIG. 5 is a schematic representation 500 of the generation of a blended intensity data for output according to an example. An image is first received as an input 510, the image may be any image type and comprise image data using an RGB, YUV or RAW color model. Based on this input 510, a contrast image is generated 520, the contrast image, such as contrast image 300 described above in relation to FIG. 3, comprises a plurality of contrast values. Each contrast value represents at least a pixel in the input image data; however, each contrast value may represent a group of pixels in the image data depending on the desired output settings. The contrast values are generated using an N×N dimension range filter, which for each given pixel indicates the difference between the maximum and minimum values within the region of the N×N dimension range filter. For example, where the input image is an image using an RGB color model, the R, G and B values for each of the pixels may be averaged across all pixels covered by the range filter, and the difference between each calculated. If the average of the R, G, and B values are the same or similar, this means that there is a small local contrast, however, if they differ significantly this may represent a larger local contrast. The smaller the local contrast the lower the contrast value. That is, in the example local contrast map 300 of FIG. 3, where the contrast values range from 0 to 1, the smaller the local contrast the closer to 0 the contrast value for a given pixel will be, and the higher the local contrast the closer to 1 the contrast value for a given pixel will be.

Once the local contrast map has been generated, an alpha mask is generated 530. The alpha mask may take several forms, however as shown in example 400 of FIG. 4, the alpha mask may be a graph indicating the mapping between the contrast values and the intensity data generated using the different intensity data calculation methods. The alpha mask may indicate contrast values, that is pixels or regions of the image data, where the first intensity data calculation method would produce the most desirable results, and the contrast values where ethe second intensity data calculation method would produce the most desirable results. These are represented by an upper and lower threshold as described above with reference to FIG. 4. The intermediary values, that is the values between the upper and lower thresholds indicate an alpha blending strategy for generating pixels and/or regions of the blended intensity data, for example by combining both a first intensity data generated by a first intensity data calculation method and the second intensity data calculated by a second intensity data calculation method according to a predefined relationship such as a power curve, look-up table or tunable linear equation, a more desirable overall blended intensity data may be produced.

The blended intensity data is then generated 540 based on the first and second intensity data generated by first intensity calculation method 550 and the second intensity calculation method 560 along with the alpha mask and contrast image generated previously. The first intensity data may be calculated 550 using the first intensity data calculation method along with the second intensity data being calculated 560 substantially in parallel alongside the generation of the contrast image and alpha mask in order to speed up the processing. Alternatively, the first intensity data and second intensity data may be calculated substantially sequentially. Once the blended intensity data is generated 540 based on the first and second intensity data, the alpha mask, and the contrast image the blended intensity data may be output 570 for further processing. For example, the blended intensity data may be output to a further processor, such as an image signal processor, central processing unit, digital signal processor, graphics processing unit or neural processing unit. The blended intensity data may also be output 570 to a display or other device for user inspection, and in some examples, the blended intensity data may be written to a memory device for future recall.

Whilst the examples described above with reference to FIGS. 1 through 5 indicate the use of only two intensity data calculation methods, it will be appreciated that more than two intensity data calculation methods may be used. In such a case, the alpha mask generated would comprise a third and subsequent thresholds each indicating the boundary between the use of intensity data generated using the intensity data calculation methods in accordance with a desired blended intensity data output to be produced.

Figure 6:
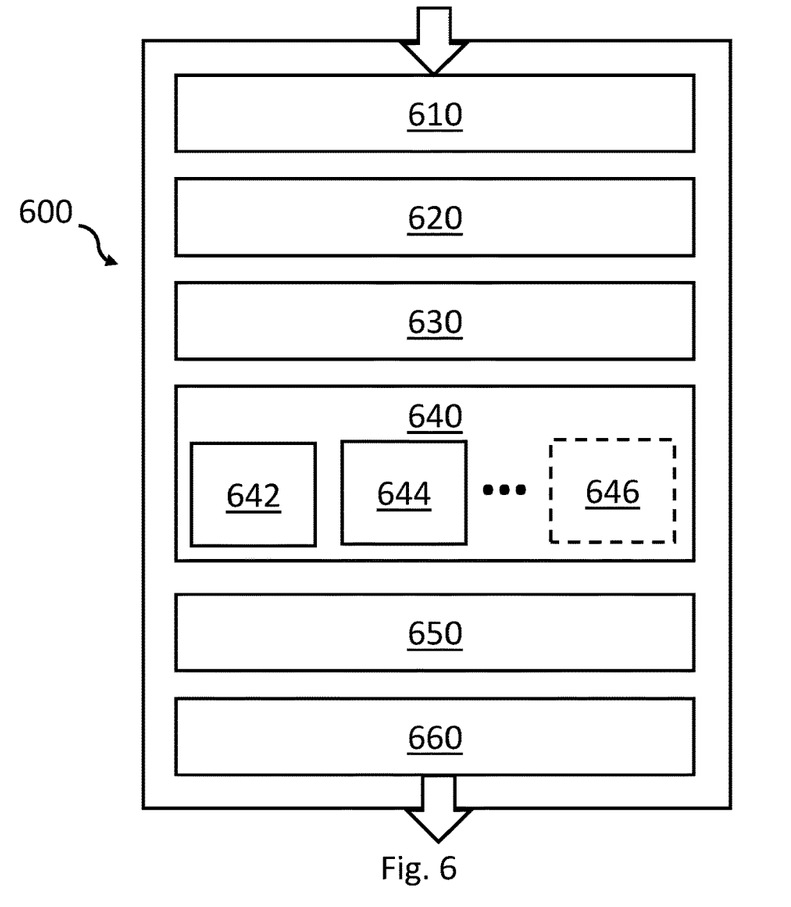
FIG. 6 is a schematic representation of a processor for generating a blended intensity data according to an example.

FIG. 6 is a schematic representation of a processor 600 for generating blended intensity data according to an example. The processor 600 may comprise a plurality of modules and/or units for processing inputs. It will be appreciated that the processor 600 may be a stand-alone processor or form part of a system, such as a system on chip (SOC) capable of undertaking several other task and processes.

The processor 600 comprises an input module 610 arranged to receive image data. The image data may be received from a sensor, such as a camera, or from storage, such as a memory associated with a system of which the processor 600 is part. Once received, the image data is used by a contrast image generation module 620 which is arranged to generate a local contrast map based on pixel data in the image data obtained. The local contrast map comprises a plurality of contrast values representing pixels and/or regions of the image data. The contrast values are based on a difference between a maximum and minimum value associated with a given pixel or region, and its surrounding pixels or regions based on an N×N dimension range filter as is described above with reference to FIGS. 2 and 3.

Following the generation of the local contrast map, an alpha mask is generated by an alpha mask generation module 630. The alpha mask generation module 630 determines which contrast values are to be associated with the application of a given intensity data generated using two or more intensity data calculation methods. The alpha mask comprises at least an upper and lower threshold which indicate the upper and lower contrast values for the application of a given intensity data calculated by a first and second intensity data calculation method as described above with reference to FIG. 4.

The processor 600 also comprises an intensity data generation module 640. The intensity data generation module generates a plurality of intensity data using different methods, such as the Luma and MaxRGB methods described above. The intensity data generation module 640 comprises individual units for the generation of intensity data using each of these methods. For example, the intensity data generation module 640 may comprise a Luma unit 642, a MaxRGB unit 644 and any number of other units 646 for calculating intensity data using other intensity data calculation methods. The generation of the intensity data may occur sequentially or in parallel with the other calculation, that is the intensity data generation module 640 may operate independently of the other modules of the processor 600.

The processor 600 also comprises a blended intensity data calculation module 650 for generating the blended intensity data. The blended intensity data calculation module 650 uses the outputs of the local contrast map module 620, the alpha mask generation module 630 and the plurality of intensity data calculated by the units 642, 644, 646 of the intensity data generation module 640. The blended intensity data calculation module 650 outputs blended intensity data using the output module 660 for further processing by another processor (not shown).

Figure 7:
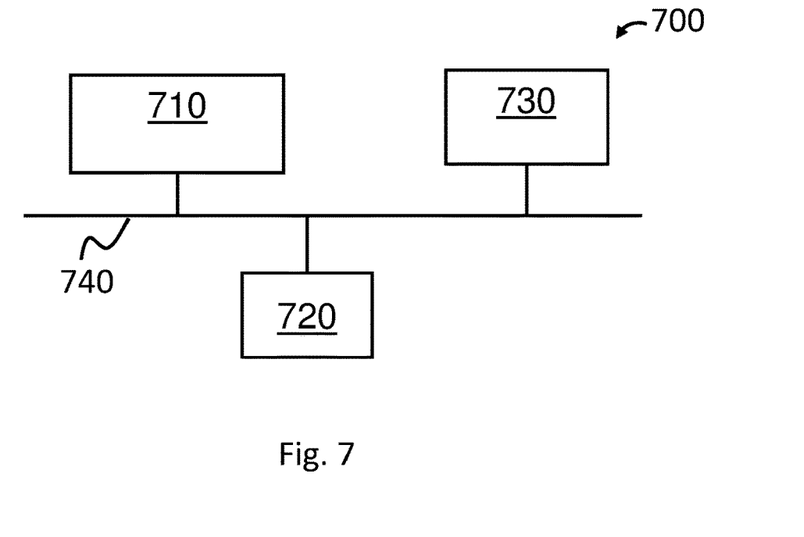
FIG. 7 is a schematic representation of a system according to an example.

FIG. 7 is a schematic representation of a system 700 according to an example. The system 700 comprises a processor 710, such as processor 600 described above with reference to FIG. 6. The system 700 may also comprise one or more input and/or storage devices 720, such as an image sensor or memory for capturing or storing image data for use by the processor 710. A memory access controller may also be provided which is connected to the memory. The memory access controller may comprise a dynamic memory controller. The memory controller is configured to manage the flow of data going to and from the memory. The memory may, for example, comprise a magnetic or optical disk and disk drive or a solid-state drive (SSD) or non-volatile RAM (NVRAM). In some examples, the memory comprises a synchronous dynamic random-access memory (SDRAM). For example, the memory may comprise a double data rate synchronous dynamic random-access memory (DDR-SDRAM).

The system 700 also comprises one or more other processors 730 which may be used for processing the blended intensity data generated by the processor 710. The processor may be any suitable processor such as a display signal processor for outputting the blended intensity data to a display, an image signal processor, a central processing unit, a graphics processing unit, and/or a neural processing unit. The further processor may be dependent on the implementation of the system 700. For example, the system 700 may be used for implementing tone mapping applications, in automotive applications, such as driverless vehicles, and in other image/video processing applications, such as image enhancement, or edge and feature detection.

One or more of the processor 710, and input and/or storage devices 720, the other processors 730, as well as other components (not shown), may be interconnected, for example using system bus 740, although it will be appreciated that the processor 710 and at least one of the other components 720, 730 of the system 700 may be directly connected to one another such that the output of one component is connected directly to the input of another component in a pipeline. This allows data to be transferred between the various components. The system bus 740 may be or include any suitable interface or bus. For example, an ARM® Advanced Microcontroller Bus Architecture (AMBA®) interface, such as the Advanced eXtensible Interface (AXI), may be used.

It will be appreciated that the system 700 may be a system on chip (SOC) specifically designed to undertake a specific task, such as a tone-mapping or automotive application, as described above.

Examples of the above-described methods may be provided by a non-transitory computer-readable storage medium comprising a set of computer-readable instructions stored thereon which, when executed by at least one processor, cause the at least one processor to perform the method. In other words, examples of the above-described methods may be provided by a computer program product. The computer program product can be provided by dedicated hardware or hardware capable of running the software in association with the appropriate software. When provided by a processor, these operations can be provided by a single dedicated processor, a single shared processor, or multiple individual processors that some of the processors can share. Moreover, the explicit use of the terms "processor" or "controller" should not be interpreted as exclusively referring to hardware capable of running software, and can implicitly include, but is not limited to, digital signal processor "DSP" hardware, GPU hardware, NPU hardware, read-only memory "ROM" for storing software, random access memory "RAM", NVRAM, and the like. Furthermore, implementations of the present disclosure can take the form of a computer program product accessible from a computer-usable storage medium or a computer-readable storage medium, the computer program product providing program code for use by or in connection with a computer or any instruction execution system. For the purposes of this description, a computer-usable storage medium or computer-readable storage medium can be any apparatus that can comprise, store, communicate, propagate, or transport a program for use by or in connection with an instruction execution system, apparatus, or device. The medium can be an electronic, magnetic, optical, electromagnetic, infrared, or semiconductor system or device or device or propagation medium. Examples of computer readable media include semiconductor or solid-state memories, magnetic tape, removable computer disks, random access memory "RAM", read only memory "ROM", rigid magnetic disks, and optical disks. Current examples of optical disks include compact disk-read only memory "CD-ROM", optical disk-read/write "CD-R/W", Blu-Ray, and DVD.

The above example implementations are to be understood as illustrative examples of the present disclosure. Further implementations are also envisaged. For example, implementations described in relation to a method may also be implemented in a computer program product, in a computer-readable storage medium, in a system, or in a device. It is, therefore, to be understood that a feature described in relation to any one implementation may be used alone, or in combination with other features described, and may also be used in combination with one or more features of another of the implementation, or a combination of other the implementations. Furthermore, equivalents and modifications not described above may also be employed without departing from the scope of the disclosure, which is defined in the accompanying claims.

What is claimed is:

1. A method for generating blended intensity data for processing by a processor, the method comprising the steps of:
   generating a local contrast map based on image data, the local contrast map comprising a plurality of contrast values;
   generating an alpha mask by associating an alpha mask value to each of said contrast values, wherein generating the alpha mask comprises:
   associating a first alpha mask value for a given contrast value if the given contrast value does not exceed a first threshold;
   associating a second alpha mask value for the given contrast value if the given contrast value exceeds a second threshold; and
   associating a third alpha mask value, the third alpha mask value being between the first alpha mask value and the second alpha mask value, when the given contrast value exceeds the first threshold and does not exceed the second threshold;
   generating first intensity data using a first intensity calculation method and second intensity data using a second intensity calculation method, where the first intensity calculation method and the second intensity calculation method are different;
   generating the blended intensity data by blending values from at least one of the first intensity data and the second intensity data based on the alpha mask values; and
   outputting the blended intensity data to the processor.

2. The method for generating blended intensity data according to claim 1, wherein the plurality of contrast values represent a difference between a maximum and minimum of a given group of pixels of the image data.

3. The method for generating blended intensity data according to claim 1, wherein the third alpha mask value is determined based on at least one of:
  a tuneable linear equation;
  a look-up table; or
  a power curve.

4. The method for generating blended intensity data according to claim 1, further comprising creating combined intensity data based on a weighting of the first intensity data and the second intensity data associated with the third alpha mask value.

5. The method for generating blended intensity data according to claim 4, wherein generating the blended intensity data comprises, for each contrast value of the contrast image:
  blending from the first intensity data, if contrast value is associated with the first alpha mask value;
  blending from the second intensity data if the contrast value is associated with the second alpha mask value; and
  blending from the combined intensity data if the contrast value is associated with the third alpha mask value.

6. The method for generating blended intensity data according to claim 1, wherein at least one of the first intensity calculation method or second intensity calculation method is a Luma intensity calculation method.

7. The method for generating blended intensity data according to claim 1, wherein at least one of the first intensity calculation method or second intensity calculation method is a MaxRGB intensity calculation method.

8. The method for generating blended intensity data according to claim 1, wherein the image data uses an RGB color model, and wherein the plurality of contrast values are based on a comparison between individual colour channels of the image data.

9. The method for generating blended intensity data according to claim 1, wherein the image data uses a RAW or YUV color model.

10. A processor for generating blended intensity data for processing by a further processor, the processor comprising;
  an input module for obtaining image data;
  a contrast image generation module for generating a local contrast map based on image data, the local contrast map comprising a plurality of contrast values;
  an alpha mask generation module for generating an alpha mask by associating an alpha mask value to each of said contrast values, wherein the alpha mask generation module:
    associates a first alpha mask value for a given contrast value if the given contrast value does not exceed a first threshold;
    associates a second alpha mask value for the given contrast value if the given contrast value exceeds a second threshold; and
    associates a third alpha mask value, the third alpha mask value being between the first alpha mask value and the second alpha mask value, when the given contrast value exceeds the first threshold and does not exceed the second threshold;
  an intensity data generation module for generating first intensity data using a first intensity calculation method and second intensity data using a second intensity calculation method, where the first intensity calculation method and the second intensity calculation method are different;
  a blended intensity data calculation module for generating the blended intensity data by blending from at least one of the first intensity data and the second intensity data based on the alpha mask values; and
  an output module for outputting the blended intensity data to the further processor.

11. The processor for generating blended intensity data according to claim 10, wherein the contrast image generation module is arranged to generate the plurality of contrast values by determining a difference between a maximum and minimum of a given group of pixels of the image data.

12. The processor for generating blended intensity data according to claim 10, wherein the third alpha mask value is determined based on at least one of:
  a tuneable linear equation;
  a look-up table; or
  a power curve.

13. The processor for generating blended intensity data according to claim 10, wherein the blended intensity data calculation module creates a combined intensity data based on a weighting of the first intensity data and the second intensity data associated with the third alpha mask value.

14. The processor for generating blended intensity data according to claim 13, wherein the blended intensity data calculation module for each contrast value of the contrast image:
  selects from the first intensity data, if contrast value is associated with the first alpha mask value;
  selects from the second intensity data if the contrast value is associated with the second alpha mask value; and
  selects from the combined intensity data if the contrast value is associated with the third alpha mask value.

15. The processor for generating blended intensity data according to claim 10, wherein the intensity data generation module comprises at least a Luma intensity calculation unit for generating at least one of the first intensity data or the second intensity data.

16. The processor for generating blended intensity data according to claim 10, wherein the intensity data generation module comprises at least a MaxRGB calculation unit for generating at least one of the first intensity data or the second intensity data.

17. The processor for generating blended intensity data according to claim 10, wherein outputting the blended intensity data to the further processor comprises outputting the blended intensity data to at least one of:
  a display processor;
  an image signal processor;
  a central processing unit;
  a graphics processing unit;
  a neural processing unit; or
  a digital signal processor.

18. A non-transitory computer-readable storage medium comprising a set of computer-readable instructions stored thereon which, when executed by at least one processor, cause the at least one processor to generate blended intensity data for processing by a further processor, the instructions comprising:
  generating a local contrast map based on image data, the local contrast map comprising a plurality of contrast values;
  generating an alpha mask by associating an alpha mask value to each of said contrast values, wherein generating the alpha mask comprises:
    associating a first alpha mask value for a given contrast value if the given contrast value does not exceed a first threshold;

associating a second alpha mask value for the given contrast value if the given contrast value exceeds a second threshold; and associating a third alpha mask value, the third alpha mask value being between the first alpha mask value and the second alpha mask value, when the given contrast value exceeds the first threshold and does not exceed the second threshold;

generating first intensity data based using a first intensity calculation method and second intensity data using a second intensity calculation method, where the first intensity calculation method and the second intensity calculation method are different;

generating the blended intensity data by blending from at least one of the first intensity data and the second intensity data based on the alpha mask values; and outputting the blended intensity data to the further processor.

\* \* \* \* \*